US005774639A

United States Patent [19]

Schildkraut et al.

[11] Patent Number: 5,774,639

[45] Date of Patent: Jun. 30, 1998

[54] PRINTER MEDIA INCLUDING COMPRESSED SENSITOMETRY CURVE INFORMATION

[75] Inventors: Jay S. Schildkraut, Rochester; Kevin E. Spaulding, Spencerport; John P. Spence, Webster, all of N.Y.

[73] Assignee: Eastman Kodak Company, Rochester, N.Y.

[21] Appl. No.: 390,616

[22] Filed: Feb. 17, 1995

[51] Int. Cl.[6] .................................................... G06K 15/00

[52] U.S. Cl. .......................................... 395/115; 395/109

[58] Field of Search .................................... 395/101, 102, 395/109, 111, 112, 113, 114, 115, 116; 358/522, 523, 500, 501, 515, 518, 519, 530; 347/188, 191, 193

[56] References Cited

U.S. PATENT DOCUMENTS

| | | | |
|---|---|---|---|
| 3,849,660 | 11/1974 | Hommerin | 250/570 |
| 4,820,686 | 4/1989 | Ito et al. | 503/227 |
| 5,085,529 | 2/1992 | McGourty et al. | 400/120 |
| 5,266,968 | 11/1993 | Stephenson | 346/76 PH |
| 5,278,577 | 1/1994 | Kitsuki | 346/1.1 |
| 5,293,539 | 3/1994 | Spence | 358/527 |
| 5,305,119 | 4/1994 | Rolleston et al. | 358/522 |
| 5,342,671 | 8/1994 | Stephenson | 428/195 |

FOREIGN PATENT DOCUMENTS

| | | | |
|---|---|---|---|
| 0 352 032 | 1/1990 | European Pat. Off. | G03C 7/00 |

OTHER PUBLICATIONS

"Monotone Piecewise Cubic Interpolation", by F. N. Fritsch and r. E. Carlso 1980 Society for Industrial and Applied Mathematics, vol. 17, No. 2, Apr. 1980; pp. 238–246.

"The Evaluation of Interior Lighting on the Basis of Visual Criteria":, by Richard Blackwell; Sep. 1967/vol. 6, No. 9/Applied Optics; pp. 1 1467.

*Primary Examiner*—Arthur G. Evans

*Attorney, Agent, or Firm*—Milton S. Sales

[57] ABSTRACT

Sensitometric information is stored with a consumable print medium having a predetermined sensitometry by compressing the sensitometric information as a set of spline coefficients for use with a printer adapted to decode the set of spline coefficients to construct a sensitometric curve. A set of spline coefficients is generated, spline coefficients are encoded, and the encoded spline coefficients are stored in a manner which is accessible to a printing device adapted to make use of the media sensitometry data for purposes of device calibration. The coefficient-generating step comprises fitting a spline curve to the sensitometry data. The spline curve may be monotonic cubic. The encoding step may include encoding a difference signal representing a difference between input values for a set of sequential spline knots. The encoding step may also include encoding a difference signal representing a difference between the output values of the sensitometry curve and output values of a reference sensitometry curve for each of a set of sequential spline knots. The difference signal may be encoded by quantizing the difference signal into a set of discrete bins.

25 Claims, 7 Drawing Sheets

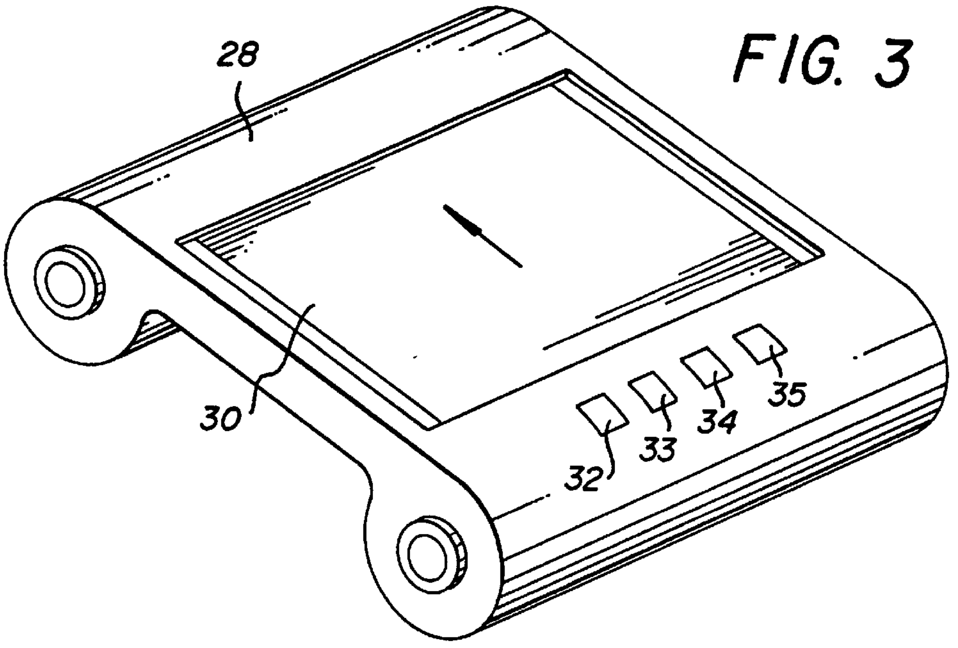
FIG. 3
FIG. 4
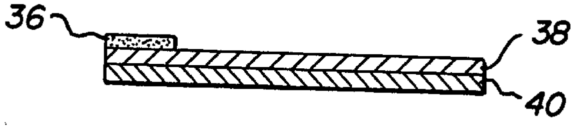
FIG. 5
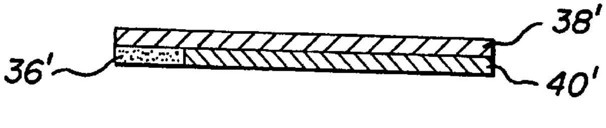
FIG. 6
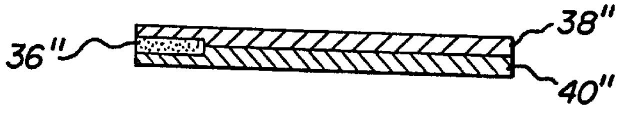

PRINTER MEDIA INCLUDING COMPRESSED SENSITOMETRY CURVE INFORMATION

CROSS-REFERENCE TO RELATED APPLICATION

Reference is made to commonly assigned, co-pending U.S. Pat. application Ser. No. 08/128,008, filed in the name of Mark Bobb on Sep. 27, 1994.

BACKGROUND OF THE INVENTION

1. Field of the Invention

The present invention relates to printing processes that use printer-sensitive consumable media. Examples of such printing processes include thermoplastic transfer printing and thermal dye transfer printing. More particularly, the present invention relates to including sensitometry information along with printer media for more accurate tone reproduction and so that the media can be updated without causing confusion regarding the appropriate sensitometry curve.

2. Background of Invention

Thermal printers selectively heat the elements of a print head to transfer dyes and inks from a donor medium to a receiver medium. Thermoplastic transfer printers have a donor medium that includes a meltable wax which is impregnated with colored pigments or inks. Portions of the wax layer are heated to a liquid state, and are transferred with the color pigments or inks to a receiver medium. Thermal dye transfer printers have a donor medium which carries a dye that is transferred to a receiver by a sublimation process. The amount of dye transferred is generally controlled by the amount of energy supplied to an individual element. A typical print head includes a plurality of selectively operable resistive heat elements.

Receiver media are available in several types optimized for a variety of applications including reflection prints and transparencies. Similarly, donor media come in several types, such as monochrome or color. A typical thermal printer adjusts the energization of the print head based upon the type of donor and receiver media used to achieve an acceptable print quality. Thermal printers typically determine the type of media present in the printer by detecting information which may be marked directly on the media or on structures associated with the media such as a spool or cassette.

Detection marks frequently convey information which identifies the media, provides positional information on the media, and also can provide additional helpful information. Examples of identification information include manufacturer, logo or trademark, media type or application, lot number, size of media, number of prints, number and/or sequence of colors, size of frame, and printing correction factors. Positional information may include side of media (front or back), beginning of media, beginning of frame, beginning of color patch, end of media, end of frame, initial print position, and direction (forward or reverse). Additional information may be included in detection marks, such as number of frames remaining, color of frame, quality of frame, printing sequence of frames, dye sensitivities, and change in dye sensitivities. Other kinds of information may also be included in the detection marks.

One method a printer uses to determine how to energize the print head is by detecting information stored in a detection mark on the dye donor and/or dye receiver. After decoding the detection mark, the printer selects appropriate print head energization parameters suited to the media present from a plurality of stored parameter tables.

U.S. Pat. No. 4,820,686, which issued to Ito et al. on Apr. 11, 1989, discloses the use of detection marks on the transfer sheet for the purpose of confirming the side of the sheet, the direction of travel, the grade of the sheet, and sheet position. The marks may be electrically conductive, magnetic, fluorescent, etc. U.S. Pat. No. 5,266,968, which issued to Stephenson in 1993, discloses a means for identifying each dye frame on a transfer sheet using a non-volatile memory associated with each transfer sheet cartridge. The memory may also contain information on defective frames and color correction data.

In conventional detection marking methods, the amount of information which can be stored in the detection mark is quite limited. For example, the amount of information which can be stored in a bar code or similar detection mark is limited by the number of lines the code includes.

To overcome this limitation, a multiplicity of tables containing print head energization parameters are frequently stored in the printer. At least one table is provided for each combination of dye donor and dye receiver which the printer can use. The number of tables which can be stored in a printer is limited by the amount of memory which the printer has. As the amount of memory increases, so does the complexity and cost of the printer hardware. Therefore, this method of storing print head energization parameters permanently in a printer has a limited usefulness.

Some other problems arise from this method of determining energization parameters for the print head. The first issue is lot-to-lot variation within a particular media formulation. The optimum performance characteristics of both donor media and receiver media vary from manufacturing lot to manufacturing lot. Thus, the tables of energization parameters stored in the printers must cover a range of performance characteristics, resulting in less than optimum performance for most lots of media.

A second issue is a long range problem. The formulations of the dye donor or dye receiver may change with time, or new formulations may be developed. To extend the usefulness of the printer, it would be highly desirable if the printers' energization parameter tables could be modified or adjusted. However, with current printer designs it is difficult and expensive to modify these parameter tables once the printer leaves the factory.

In order to achieve dramatic improvements, it is necessary to provide more media-carried information to the printer than current detection marking methods can provide. Therefore, a new high capacity method is needed for marking and detecting information on donor media, receiver media or their associated structures such as spools or cassettes. Such additional information capacity would permit a printer to adjust its stored performance parameters to permit optimum print quality for each lot of dye donor or dye receiver, or for new media formulations.

Commonly assigned, co-pending U.S. Pat. application Ser. No. 08/128,008, filed in the name of Mark Bobb on Sep. 27, 1994, provides a method of storing information with a consumable thermal transfer printer medium, wherein medium information to be associated with a thermal transfer printer medium is compressed and stored in physical association with the thermal transfer printer medium. The information compression may be by adaptive means, by error correction code means, or other suitable means; with or without an error correction code and with or without encrypting. The information may be stored on the thermal transfer donor medium, on the thermal transfer receiver medium, on a label adhered to the medium, or on accompanying structure such as a spool or cassette.

SUMMARY OF THE INVENTION

An object of the present invention is to provide media with memory comprising encoded media specific sensitometry information in order to enable a printer adapted to decode said memory to produce output with accurate tone reproduction using said media.

Another object of the present invention is to encode media specific sensitometry information in a way that advantageously reduces the amount of memory required.

Another object of the present invention is to provide more information about a thermal printer media in a high information capacity indicia or detection mark applied to the media, or cassette holding the media, or like structure.

A further object of the present invention is to provide a method for a thermal printer for detecting a high information capacity indicia or detection mark, and decoding the same for subsequent operation of the printer.

Another object of this invention is to provide optimum print quality by adjusting for lot-to-lot variation in performance characteristics of the media.

Still another object of the present invention is to provide a method for a thermal printer for automatically adjusting printing parameters for new formulations of a media automatically.

A further object of the present invention is to store printing parameter modification information on the dye donor media, dye receiver media or support structures such as spool cores or cassettes.

Still a further object of the present invention is to store information on the media or support structures using data compression techniques, and to provide a thermal printer capable of decompressing such information.

According to the above objects, the present invention provides for storing information with a consumable print medium having a predetermined sensitometry, wherein sensitometric information is compressed as a set of spline coefficients for use with a printer adapted to decode the set of encoded spline coefficients to construct a sensitometric curve.

According to a preferred embodiment of the present invention, the media is thermal donor ribbon for use with a dye sublimation printer. The method includes the steps of generating a set of spline coefficients; encoding the spline coefficients; and storing the encoded spline coefficients in a manner which is accessible to a printing device adapted to make use of the media sensitometry data for purposes of device calibration. The coefficient-generating step comprises fitting a spline curve to the sensitometry data. The spline curve may be monotonic cubic. Encoding the spline coefficients may be done by storing a difference between input values for a set of sequential spline knots. The encoding step may include encoding the spline coefficients by storing a difference signal representing a difference between the output values of the sensitometry curve and output values of a reference sensitometry curve for each of a set of knots in the set of splines. The difference signal may be encoded by quantizing the difference signal into a set of discrete bins.

The invention, and its objects and advantages, will become more apparent in the detailed description of the preferred embodiments presented below.

BRIEF DESCRIPTION OF THE DRAWINGS

FIG. 3 shows a cassette with information marked in the form of reflective strips;

FIG. 4 shows a dye donor or dye receiver media with information marked on surface of the media;

FIG. 5 shows a dye donor or dye receiver media with information formed as a portion of one of the layers which form the media;

FIG. 6 shows a dye donor or dye receiver media with information marked in between layers which form the media;

DESCRIPTION OF THE PREFERRED EMBODIMENTS

Figure 1:
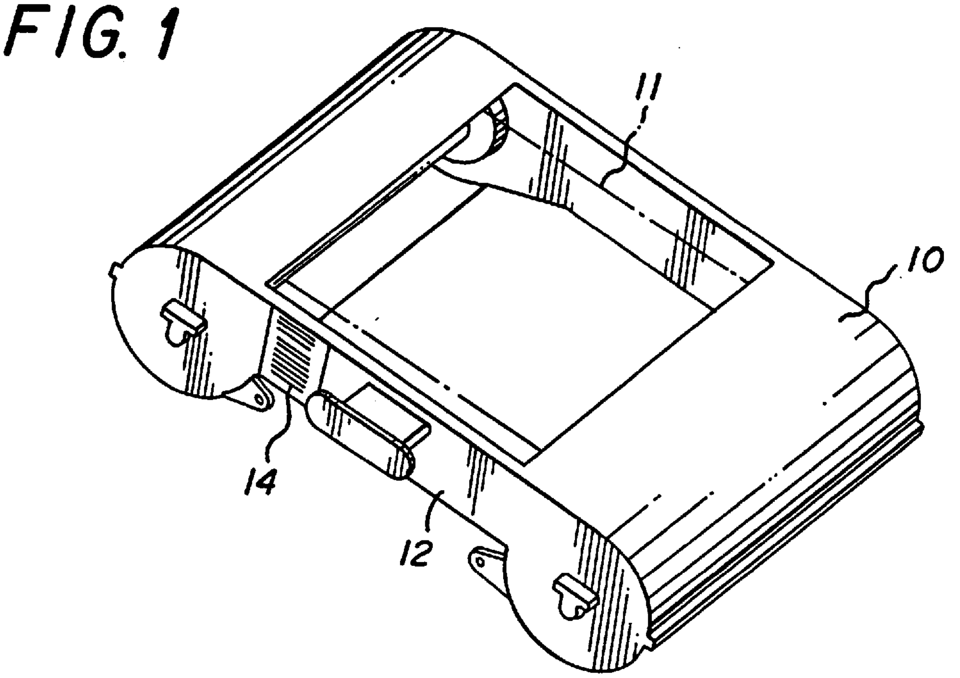
FIG. 1 shows a dye donor cassette with bar coded information marked on a side.

Information may be associated with printer media in many ways. FIGS. 1–13 illustrate several known ways of doing so. FIG. 1 shows a donor medium cassette 10 containing donor medium 11 with information marked on a side 12 in the form of a bar code 14 which would be detected by the thermal printer (not shown).

Figure 2:
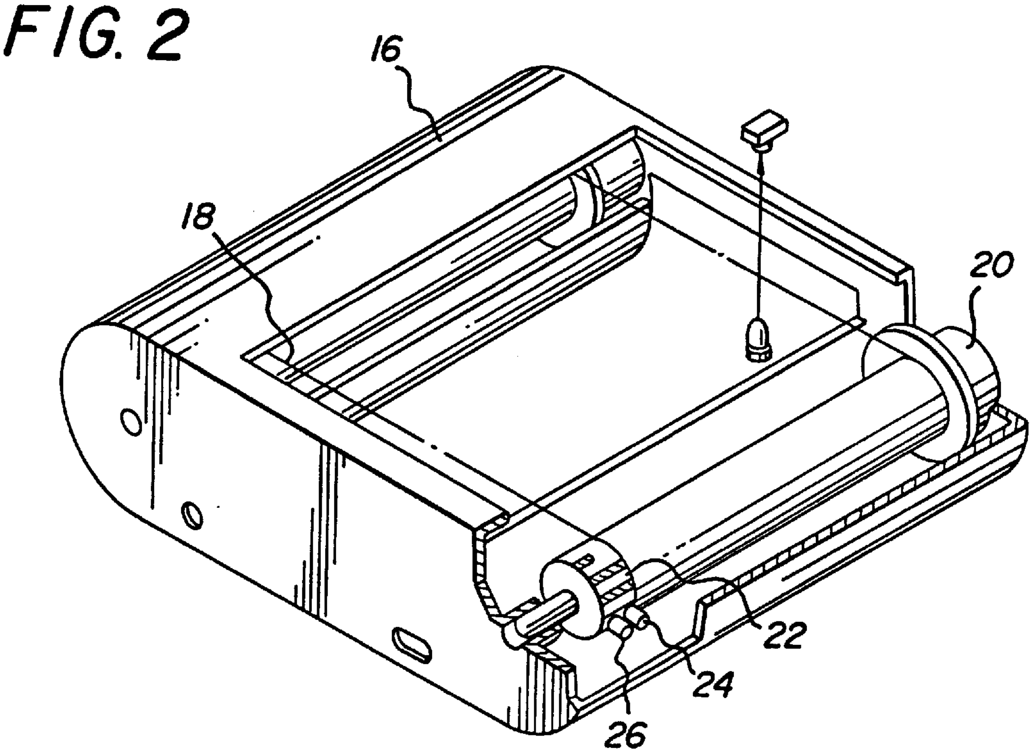
FIG. 2 shows a dye donor cassette with information marked on the end of a spool.

FIG. 2 shows another donor medium cassette 16 containing donor medium 18 in which information is marked on the end of a spool 20 within dye donor cassette 16 in the form of long and short bars 22 which are detected by optical sensors 24 and 26 of a thermal printer (not shown).

FIG. 3 shows a different method for conveying information in which reflective strips are located on a donor cassette 28 containing donor medium 30. A plurality of reflective strips 32–35 are attached to cassette 28 and can be detected optically, electrically or magnetically in such a way that their presence or absence indicates information.

Information can also be encoded directly on the donor media or receiver media. As shown in FIG. 4, detection marks 36 can be located on the top of a dye or pigment layer 38 of the media, where layer 38 is on top of a support layer 40. Although not shown, detection marks 36 could also be formed on the support layer 40.

Alternatively, detection marks can be formed as an integral portion of one of the layers which make up the media such as in FIG. 5 where the mark 36' is formed as part of the support layer 40'. Again not shown is the alternative where detection mark 36' is formed as part of a dye or pigment layer 38'. Yet another method could have detection marks 36" imbedded in the media between layers 38" and 40" as shown in FIG. 6.

Figure 7:
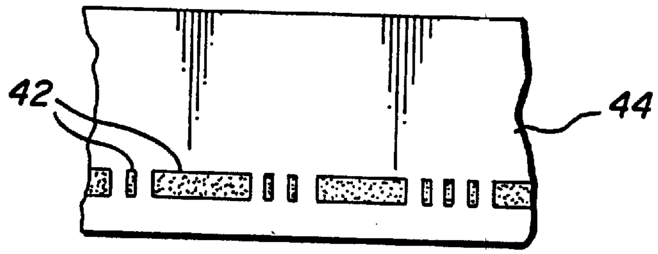
FIG. 7 shows a dye donor or dye receiver media with information marked in a machine readable code.
Figure 8:
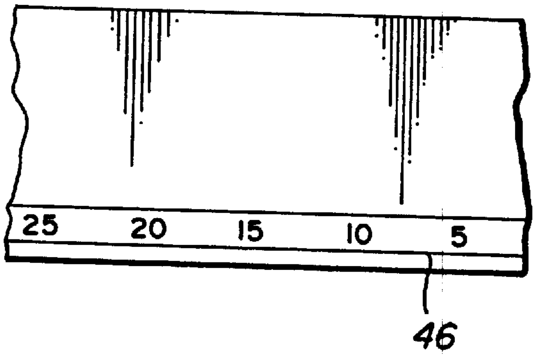
FIG. 8 shows a dye donor or dye receiver media with information marked in a human readable code.
Figure 9:
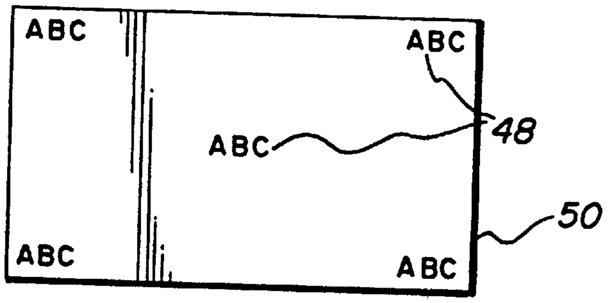
FIG. 9 shows a dye donor or dye receiver media with information marked in an alphanumeric code.
Figure 10:
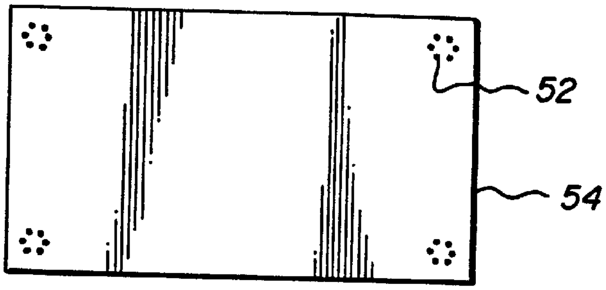
FIG. 10 shows a dye donor or dye receiver media with information marked in a customized shape.
Figure 11:
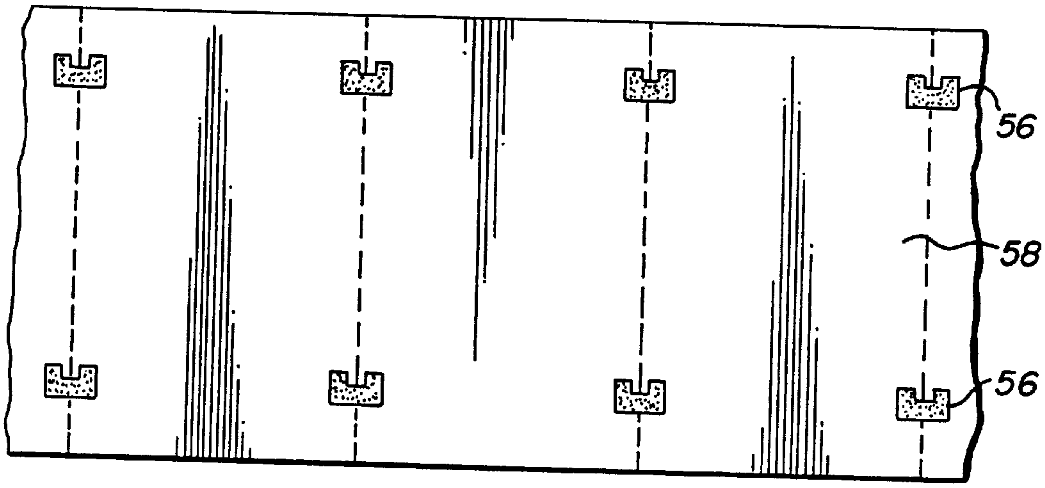
FIG. 11 shows a dye donor or dye receiver media with information marked in another customized shape.

Information marked on media or structures such as cassettes may take many forms. Bar codes 14 and machine readable codes 22 have already been shown in FIGS. 1 and 2, respectively. A different machine readable code 42 marked on a donor medium 44 is shown in FIG. 7. Additional forms include, but are not limited to, human readable codes 46 in FIG. 8, alphanumeric codes 48 shown on a receiver medium 50 in FIG. 9, or other codes such as optical character recognition codes (not shown). Other customized detection marks may also be used, such as geometric shapes 52 shown on a dye receiver 54 in FIG. 10 and cut marks 56 shown on a continuous dye receiver medium 58 shown in FIG. 11.

Figure 12:
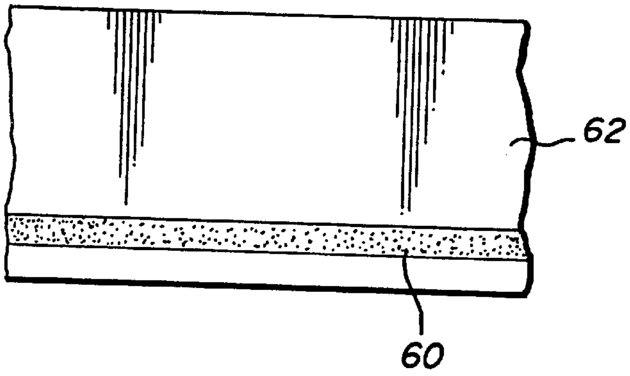
FIG. 12 shows dye donor or dye receiver media with information marked in a magnetically detectable strip.

Media may be marked with information in patterns that are optically detectable by either transmission or reflection such as the bar code 14 in FIG. 1, or on a magnetically detectable strip 60 shown on a continuous receiver medium 62 in FIG. 12.

Figure 13A:
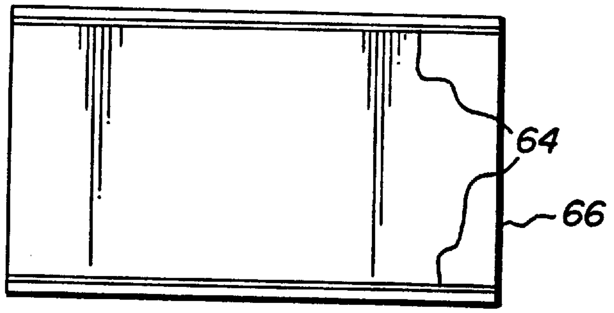
FIGS. 13*a, b* and *c* show dye donor or dye receiver media with information marked in an electroconductively detectable strip.
Figure 13B:
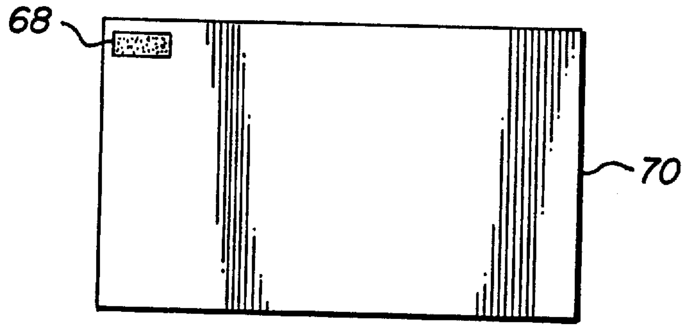
Figure 13C:
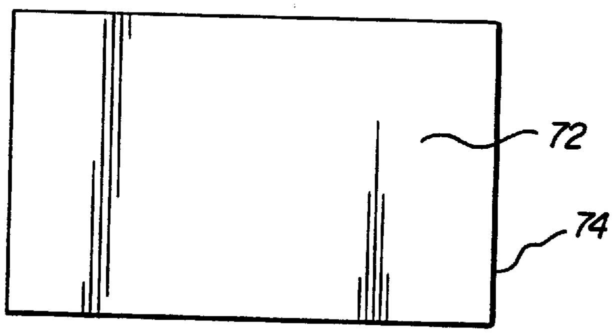

Electroconductively detectable marking methods 64 are shown in FIG. 13A on a dye receiver 66, while mechanically detectable markings such as notches (not shown) are well known in photographic films. Finally, a bar code 68 or other mark could be applied to the receiver medium 70 as shown in FIG. 13B. Any of the detection marks discussed herein could be applied with nonvisible marking methods such as represented at 72 on a receiver medium 74 in FIG. 13C.

A sensitometry curve is typically a relationship between input printer code values and output print densities. Sensitometry curves can vary for a specific type of media due to manufacturing variations or design changes in media properties. A sensitometry curve may be represented in a variety of ways, including, among others, a complete list of 12-bit print densities for each possible input code value, a mathematical function such as an exponential parameterized by a scale and decay rate or a polynomial interpolating a discrete set of code values and corresponding print densities.

One particularly suitable family of representation methods is that of piecewise defined functions, hereinafter referred to as splines, that provide means to reconstruct an entire sensitometry curve given a limited set of input-output pairs. The simplest example is the well-known method of linear interpolation in a table of values, wherein a reconstructed output value for a particular input value is computed by first locating a pair of inputs in the table that bound the input value in question, second computing the straight line joining the corresponding tabulated input-output pairs, and third evaluating the line at the input value in question.

Linear interpolation is limited in its ability to accurately represent curves with extreme curvature without use of a large number of table entries. Interpolation based on use of functions which are curved to compute values between table entries overcome this limitation and allow use of fewer table entries. One particularly suitable representation method, a monotone derivative cubic spline (hereinafter referred to as a monder spline), is described by F. N. Fritsch and R. E. 30i Carlson in MONOTONE PIECEWISE CUBIC INTERPOLATION, Society for Industrial and Applied Mathematics Journal; Vol. 17, No. 2, April 1980. A monder spline is advantageous in that it provides needed flexibility as well as interpolated output values that are guaranteed to be monotone between the given values. Monotonicity of representation is critical in determining a unique printer code value to be used to obtain a specific output density. Other interpolatory methods, such as linear interpolation or rational quadratic splines, have similar properties and could be used as well. In a preferred embodiment, a printer is adapted to decode specific encoded sensitometric curve information from memory associated with media to obtain a discrete set of input-output pairs to be interpolated with a monder spline.

Such a discrete set of input-output pairs to be used in a monder spline representation of a sensitometry curve may be obtained by a variety of techniques, including among others trial-and-error, direct measurement of the discrete set of input-output pairs as practiced in commonly assigned U.S. Pat. No. 5,293,539, which issued to J. Spence on Mar. 8, 1994, or fitting a monder spline to experimental data using a least squares procedure.

Representing a sensitometric curve by a least squares monder spline interpolant to a parsimonious set of input-output pairs advantageously serves both (via parsimony) to reduce data storage requirements and (via least squares) to smooth experimental output density data. Such data can be taken at a larger set of input values comprising values not collocated with the inputs of the representation or values obtained by repeated trials. On-site measurement of a parsimonious set of input-output pairs as practiced in aforesaid U.S. Pat. No. 5,293,539 is sensitive to experimental variations, can poorly represent behavior of the sensitometry curve in areas not sampled in a limited data set, and can be prohibitively expensive to obtain, requiring costly measurement apparatus and expenditure of time and materials.

Figure 14:
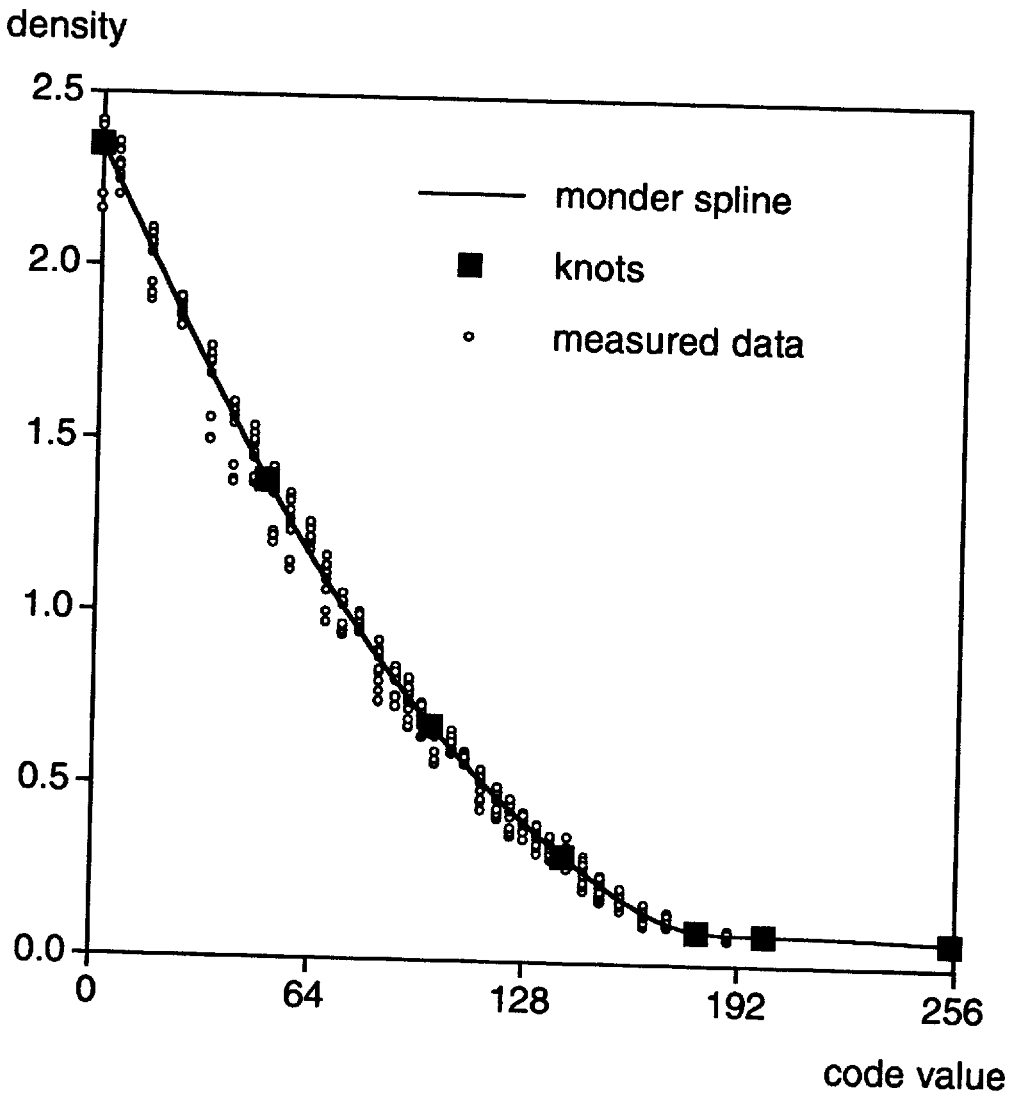
FIG. 14 is a graph showing an example of sensitometry data and a least squares monder spline fit thereto.

An example of sensitometry data and a least squares monder spline fit thereto is shown in FIG. 14. The monder spline comprises a discrete set of input-output pairs, referred to as knots, each with a X and F value. The X value is associated with the input printer code value axis and the F value with the output print density axis.

A least-squares monder spline can be fit to the measured sensitometry data. A description of the least-squares monder spline used in this invention is as follows. In an interpolatory cubic spline, knots representing input-output data are connected by cubic polynomials which are joined together to give a smooth curve. In a monotone cubic spline, these polynomials are modified to give a usually less smooth curve which is additionally constrained to be strictly increasing or decreasing between the knots. In a least-squares smoothing spline, knots are still used to define a spline. However, the knots used are fewer in number than and placed differently from measured data points.

In general, a least-squares fit of a curve to measured data is obtained by adjusting curve parameters to minimize the sum of squared prediction errors at the data points. In the least-squares smoothing spline, the curve parameters are output values associated with a specified set of input values. Once these parameters are determined, predicted output values can be computed for arbitrary input values. As the number of knots used is significantly lower than the number of data points and even more significantly lower than the number of points at which predictions are desired, a significant data reduction is thus obtained.

In the case of an ordinary cubic spline for a given set of input-output value pairs, a system of linear equations relating the slope of the spline at each knot to the given input-output values is formed. These equations enforce continuity of the curve as well as the slopes (first derivative) and curvatures (second derivatives) at the knots. The resulting system, involving one linear equation in at most three variables for each input value, is particularly easy to solve. Once the values and slopes are known for each pair of adjacent knots, a cubic polynomial is fully defined over an interval contained therein. In the case of an ordinary cubic spline, interpolated values with (relatively) abrupt changes often oscillate between the knots even when the data they interpolate are strictly increasing or decreasing. Given an oscillatory cubic spline, a monder spline which maintains continuity of the curve and its slope by relaxing the curvature continuity constraint can easily be found using a single pass algorithm, as described in the above-noted SIAM article by Fritsch and Carlson.

In the monder spline method a scan is made of the initial spline fit to locate intervals in which the spline is not monotonic and modifies the end slopes to enforce monotonicity. If no such intervals are found, no changes are made. Linear least squares solution of problems in which the prediction function is a linear function of the parameters can be solved in a single step. Fitting a smoothing spline is generally such a problem. However, in cases where a monotonicity constraint is required, the parameters of the prediction function are no longer linearly involved. Therefore, a nonlinear least squares algorithm is required.

Nonlinear least squares problems are commonly solved using an iterative procedure starting with initial guesses for the parameters of the fitting function. Each iteration improves the guesses for the parameters until the values settle down. In this context, the parameters of the fit are the values of the spline at the knots. Starting guesses for the values of the spline are obtained by performing a (linear) least squares fit of a piecewise linear (or "broken line") spline to the data. The resulting values are then used to compute an initial monotone cubic spline. The iterative method chosen is a quasi-Newton algorithm in which at each improvement step the nonlinear equations relating parameter values to predicted values are linearized at the current guess to obtain linear equations relating desired changes in predicted values to changes in the parameter values, a linear least squares problem. To solve a linear least squares problem, a set of overdetermined linear equations is solved using the well-known QR matrix factorization algorithm.

By whatever means knots are obtained, the printer is adapted to decode from the media-associated memory knots encoded using methods hereinafter described. Once the knots are determined, predicted values of print density are obtained for arbitrary printer code values using a monder spline. Such predictive capability can illustratively be used to determine a set of printer code values to use to obtain a specific set of output densities, that is, a lookup table.

Once the knots of the spline representation have been determined, an additional problem that needs to be solved is reduction of the number of bits needed to store the knot locations and values. Given N knots consisting of locations $X_i$ and values $F_i$ (i=1 to N) we begin by transforming the X values using, $$\Delta X_i = X_i - X_i - 1. \qquad (1)$$

In the case of i=1 we subtract zero since $X_O$ is undefined. Next, we search for $\Delta X_i$ in a look up table (LUT) to find a corresponding integer code value.

$$X\_\mathrm{Code}_i = LUT(\Delta X_i) \qquad (2)$$

It is assumed that knot positions are chosen so that the difference between adjacent knots, as calculated from Equation 1, be limited to values in this LUT. This limitation still allows a knot to be placed at any code value, but greatly reduces the number of bits needed to encode each $X_i$, thereby compressing the information contained in the $X_i$. If this limitation is imposed, the process is completely lossless. The original X values can be exactly retrieved from the compressed values.

The $F_i$ values are first transformed as follows $$\Delta F_i = F_i - SC(X_i) \qquad (3)$$

where SC(X) is a standard curve which represents typical sensitometric data. Next, $\Delta F_i$ is divided by a quantum $Q_j$ chosen from a set $Q_1$ to $Q_M$. The size of the quantum is typically related to the sensitivity of a human observer to errors in reconstructed sensitometry. The result is rounded to the nearest integer value to obtain an F code value:

$$F\_\mathrm{Code}_i = round(\Delta F_i / Q_j) \qquad (4)$$

The appropriate quantum is selected based on the value of $SC(X_i)$. In general, the greater the density is the coarser the quantization can be. Again, many fewer bits are used to encode the Fi, although in this case, the procedure is not lossless. However, when the quanta $Q_j$ are chosen relative to the sensitivity of a human observer, reconstructed values are visually indistinguishable from those obtained using the original $F_i$.

Once a set of encoded X and F values are obtained, it can be placed in a memory element associated with the media using methods including but not limited to magnetic stripes placed directly on media, magnetic stripes placed on media spools, digital memory, magnetic disks, bar codes, or other optical encoding marks. In a preferred embodiment, the memory element is read by the printer and the encoded X and F values are decoded by reversing the encoding procedure as follows. The X values are decoded by consulting a copy of the LUT used to encode the X values, and applying Equation 1 in reverse. First, obtain Xl directly from the LUT using its code value. Then, serially obtain values of $X_2$ through $X_N$ by incrementing each predecessor by the value in the LUT corresponding to its code value. The F values are decoded by consulting copies of the standard curve and quanta used to encode the F values and applying Equation 4 in reverse to obtain an increment and then applying Equation 3 in reverse to obtain an F value. That is, for each F code value, the corresponding quantum is multiplied by the code value and added to the corresponding standard curve value to obtain a reconstructed F value.

Figure 15:
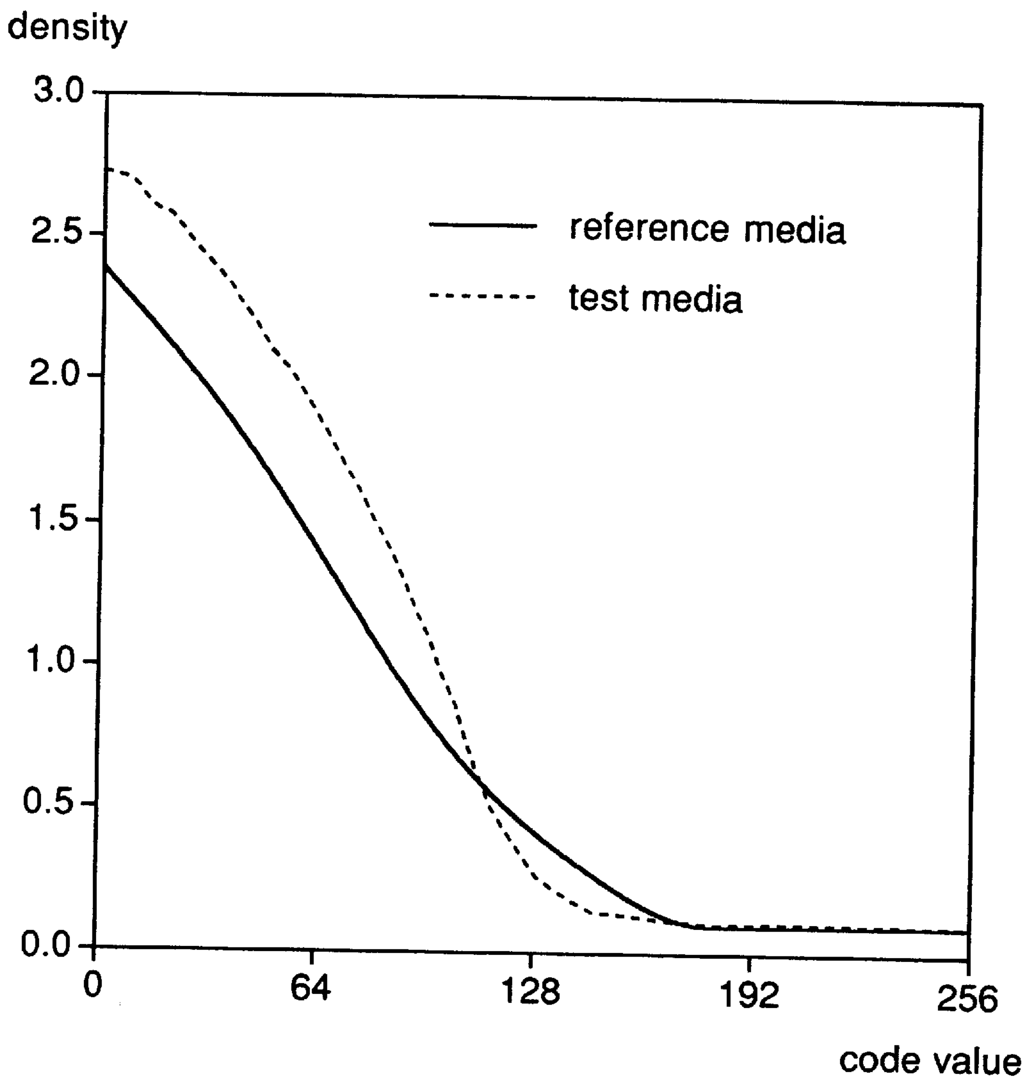
FIG. 15 is a plot of a reference media sensitometry curve and a spline reconstruction of a test media curve.

An example of this encoding and decoding procedure follows. The knot values computed for a monder spline for the "Test Median" sensitometry curve shown in FIG. 15 are:

| Knot Index | X | F |
|---|---|---|
| 1 | 0.000000 | 2.759299 |
| 2 | 40.00000 | 2.285252 |
| 3 | 80.00000 | 1.527902 |
| 4 | 120.0000 | 0.452081 |
| 5 | 150.0000 | 0.120135 |
| 6 | 170.0000 | 0.116555 |
| 7 | 250.0000 | 0.042220 |

The LUT for compression of the knot locations used in Equation (2) is:

| X_Code | ΔX |
|---|---|
| 0 | 0 |
| 1 | 2 |
| 2 | 3 |
| 3 | 4 |
| 4 | 5 |
| 5 | 7 |
| 6 | 10 |
| 7 | 15 |
| 8 | 20 |
| 9 | 30 |
| 10 | 40 |
| 11 | 50 |
| 12 | 60 |
| 13 | 70 |
| 14 | 80 |
| 15 | 100 |

The standard curve used is the one labeled "Reference Media" in FIG. 15. The standard curve values at the positions of the knots used for the monder spline for the "Test Media" Sensitometry curve are:

| Knot Index | X | F |
|---|---|---|
| 1 | 0.000000 | 2.385361 |
| 2 | 40.00000 | 1.828514 |
| 3 | 80.00000 | 1.105507 |
| 4 | 120.0000 | 0.507216 |
| 5 | 150.0000 | 0.237977 |
| 6 | 170.0000 | 0.116563 |
| 7 | 250.0000 | 0.097463 |

Threshold visual density differences at a luminance of 100 fL, determined from "The Evaluation of Interior Lighting On The Basis Of Visual Criteria" in APPLIED OPTICS 6, 1967 BY Blackwell, were used for the quantizers in Equation (4):

| Standard curve F value | Quantizer |
|---|---|
| 0.0000–0.5229 | 0.0065 |
| 0.5229–1.0000 | 0.0083 |
| 1.0000–1.5229 | 0.0100 |
| 1.5229–2.0000 | 0.0140 |
| 2.0000–2.5229 | 0.0230 |
| 2.5229–3.0000 | 0.0360 |

Using Equations (1) through (4) the code values for this spline are:

| Knot | X code | F code |
|---|---|---|
| 1 | 0 | 16 |
| 2 | 10 | 33 |
| 3 | 10 | 42 |
| 4 | 10 | −8 |
| 5 | 9 | −18 |
| 6 | 8 | 0 |
| 7 | 14 | −8 |

The knot values for the reconstructed spline can then be determined:

-continued

| Knot | X | F |
|---|---|---|
| 1 | 0.000000 | 2.753361 |
| 2 | 40.00000 | 2.290514 |
| 3 | 80.00000 | 1.525507 |
| 4 | 120.0000 | 0.455216 |
| 5 | 150.0000 | 0.120977 |
| 6 | 170.0000 | 0.116563 |
| 7 | 250.0000 | 0.045463 |

Sensitometry curves obtained from the original spline and reconstructed spline result in tone reproduction that is visually indistinguishable. To quantify this we define a visual difference parameter, VD. The VD is the average fraction of absolute density error to the threshold visual density difference $$VD = \frac{1}{256} \sum_{i=0}^{255} \mathrm{abs}(F_i^{org} - F_i^{rec})/T_i \quad (5)$$

where the sum is over all code values, $F_i^{org}$ is determined from the original spline, and $F_i^{rec}$ from the spline after it is compressed and uncompressed. $T_i$ is the threshold visual density difference at a density of $F_i^{org}$. In this example, the threshold visual density difference are used for the quantizers $Q_i$ although this need not always be the case. The value of VD for this example is 0.19, which indicates that on average the density errors are 19% of the visually detectable level.

In the above example, the original sensitometry curve consists of 256 12-bit numbers which requires 3,072 bits of storage. Application of a monder spline having seven knots reduces the curve to seven 8-bit X values and seven 12-bit F values. This is a total of 140 bits. Additional encoding of the X and F values allow the X value to be represented by a 4-bit number and the F value by an 8-bit number. Thus, the original 3,072 bits is reduced to only 84 bits. This is a 97% reduction in storage space.

The invention has been described in detail with particular reference to preferred embodiments thereof, but it will be understood that variations and modifications can be effected within the spirit and scope of the invention.

What is claimed is:

1. A product for use with a printer adapted to use a set of spline coefficients to construct a sensitometric curve, said product comprising:

imaging media having a predetermined sensitometry; and memory in which is stored a set of such spline coefficients which represent the predetermined sensitometry of the media.

2. A product as defined in claim 1 wherein the imaging media is thermal donor ribbon for use with a dye sublimation printer.

3. A method for efficiently storing media sensitometry data for imaging media, said method comprising the steps of:

generating a set of spline coefficients;

encoding the spline coefficients; and storing the encoded spline coefficients in a manner which is accessible to a printing device adapted to make use of the media sensitometry data for purposes of device calibration.

4. The method defined in claim 3 wherein the coefficient-generating step comprises fitting a spline curve to the sensitometry data.

5. The method defined in claim 4 wherein the coefficient-generating step comprises fitting a monotonic cubic spline curve to the sensitometry data.

6. The method defined in claim 4 wherein the coefficient-generating step comprises fitting a rational quadratic spline curve to the sensitometry data.

7. The method defined in claim 3, wherein the encoding step comprises encoding the spline coefficients by storing a difference signal representing a difference between input values for a set of sequential spline knots.

8. The method defined in claim 7 wherein:

plural sets of encoded spline coefficients are stored in memory in the printing device; and the media is encoded with information to identify one particular set of coefficients.

9. The method defined in claim 3, wherein the encoding step comprises encoding the spline coefficients by storing a difference signal representing a difference between the output values of the sensitometry curve and output values of a reference sensitometry curve for each of a set of sequential spline knots.

10. The method defined in claim 9 wherein the difference signal is encoded by quantizing the difference signal into a set of discrete bins.

11. The method defined in claim 10 wherein the size of the discrete bins varies as a function of the input values of the sensitometric curve.

12. The method defined in claim 10 wherein the size of the discrete bins is determined from the smallest difference in the output value of the sensitometry curve which can be detected by a human observer.

13. The method defined in claim 9 wherein:

plural sets of encoded spline coefficients are stored in memory in the printing device; and the media is encoded with information to identify one particular set of coefficients.

14. The method defined in claim 3 wherein:

plural sets of encoded spline coefficients are stored in memory in the printing device; and the media is encoded with information to identify one particular set of coefficients.

15. The method defined in claim 3 wherein the encoding step comprises encoding the input and output values of the sensitometry curve for the set of sequential spline knots.

16. A method for efficiently storing media sensitometry data for imaging media, said method comprising the steps of:

generating a set of spline coefficients;

encoding the spline coefficients; and storing the encoded spline coefficients in a manner which is associated with the imaging media so as to be accessible to a printing device which makes use of said media sensitometry data for purposes of device calibration.

17. The method defined in claim 16 wherein the encoded spline coefficients are stored on a magnetic stripe on the imaging media.

18. The method defined in claim 16 wherein the encoded spline coefficients are stored on a magnetic stripe on a spool associated with the imaging media.

19. The method defined in claim 16 wherein the encoded spline coefficients are stored on a digital memory associated with the imaging media.

20. The method defined in claim 16 wherein the encoded spline coefficients are stored on a magnetic disk associated with the imaging media.

21. The method defined in claim 16 herein the encoded spline coefficients are stored on a bar code on a spool associated with the imaging media.

22. The method defined in claim 16 wherein the encoded spline coefficients are stored using optical encoding marks on the imaging media.

23. The method defined in claim 16 wherein the coefficient-generating step comprises fitting a spline curve to the sensitometry data.

24. The method defined in claim 16, wherein the encoding step comprises encoding the spline coefficients by storing a difference between input values for a set of sequential spline knots.

25. The method defined in claim 16, wherein the encoding step comprises encoding the spline coefficients by storing a difference signal representing a difference between the output values of the sensitometry curve and output values of a reference sensitometry curve for each of a set of knots in the set of splines.

* * * * *